(12) United States Patent
Gang et al.

(10) Patent No.: US 12,206,919 B2
(45) Date of Patent: *Jan. 21, 2025

(54) TIME-BASED CONTENT SYNCHRONIZATION

(71) Applicant: Perfect Sense, Inc., Reston, VA (US)

(72) Inventors: David Gang, Oakton, VA (US); Bryan Morgan, Ramona, CA (US)

(73) Assignee: Perfect Sense, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,287

(22) Filed: Jul. 24, 2023

(65) Prior Publication Data

US 2024/0171789 A1 May 23, 2024

Related U.S. Application Data

(63) Continuation of application No. 17/460,800, filed on Aug. 30, 2021, now Pat. No. 11,711,556, which is a continuation of application No. 16/865,468, filed on May 4, 2020, now Pat. No. 11,109,078, which is a continuation of application No. 16/382,563, filed on Apr. 12, 2019, now Pat. No. 10,645,431, which is a continuation of application No. 15/703,428, filed on Sep. 13, 2017, now Pat. No. 10,264,297.

(51) Int. Cl.
*H04N 21/235* (2011.01)
*H04N 21/234* (2011.01)
*H04N 21/242* (2011.01)
*H04N 21/432* (2011.01)

(52) U.S. Cl.
CPC ......... *H04N 21/235* (2013.01); *H04N 21/234* (2013.01); *H04N 21/242* (2013.01); *H04N 21/4325* (2013.01)

(58) Field of Classification Search
CPC .............. H04N 21/234; H04N 21/235; H04N 21/242; H04N 21/4325
See application file for complete search history.

(56) References Cited

U.S. PATENT DOCUMENTS

| | | | | |
|---|---|---|---|---|
| 6,889,325 | B1 * | 5/2005 | Sipman | H04L 63/126 380/37 |
| 7,120,925 | B2 * | 10/2006 | D'Souza | H04N 21/8549 725/50 |
| 7,373,650 | B1 * | 5/2008 | Rodriguez | H04N 21/42676 348/565 |
| 7,769,756 | B2 * | 8/2010 | Krikorian | H04N 19/14 707/736 |

(Continued)

*Primary Examiner* — Michael B. Pierorazio
(74) *Attorney, Agent, or Firm* — Fish & Richardson P.C.

(57) ABSTRACT

In some implementations, a system is capable of dynamically associating content streams to improve a user's viewing experience while accessing primary content. To accomplish this, the CMS uses content association data assigning secondary content items to the primary content. Secondary content items can be assigned to designated frames of the primary content so that the secondary content items are presented to user at specified time points during the playback of the primary content. Secondary content items can represent content that is related to the subject matter of the primary content, or content that a user may be interested in accessing while viewing the primary content.

20 Claims, 11 Drawing Sheets

(56) References Cited

U.S. PATENT DOCUMENTS

| | | | | |
|---|---|---|---|---|
| 8,190,435 B2* | 5/2012 | Li-Chun Wang | ..... | G06F 16/683 704/270 |
| 8,290,423 B2* | 10/2012 | Wang | ..... | H04B 17/23 455/2.01 |
| 8,312,376 B2* | 11/2012 | Barrett | ..... | H04N 21/25866 715/764 |
| 8,566,475 B2* | 10/2013 | Peters | ..... | H04N 21/4788 709/204 |
| 8,650,603 B2* | 2/2014 | Doets | ..... | H04N 21/25891 725/38 |
| 8,688,600 B2* | 4/2014 | Barton | ..... | G06Q 30/0601 84/603 |
| 8,725,829 B2* | 5/2014 | Wang | ..... | G11B 27/28 704/239 |
| 8,811,885 B2* | 8/2014 | Wang | ..... | H04H 60/44 455/2.01 |
| 10,264,297 B1* | 4/2019 | Gang | ..... | H04N 21/242 |
| 10,645,431 B2* | 5/2020 | Gang | ..... | H04N 21/4325 |
| 11,109,078 B2 | 8/2021 | Gang et al. | | |
| 11,711,556 B2 | 7/2023 | Gang et al. | | |
| 2002/0072982 A1* | 6/2002 | Barton | ..... | G06Q 30/0625 705/14.1 |
| 2002/0083060 A1* | 6/2002 | Wang | ..... | G11B 27/28 |
| 2003/0117427 A1* | 6/2003 | Haughawout | ..... | H04N 21/4222 715/710 |
| 2004/0199387 A1* | 10/2004 | Wang | ..... | G10L 15/26 704/E15.045 |
| 2005/0028195 A1* | 2/2005 | Feinleib | ..... | H04N 7/163 725/135 |
| 2005/0091274 A1* | 4/2005 | Stanford | ..... | G06F 16/9577 |
| 2005/0108751 A1* | 5/2005 | Dacosta | ..... | H04N 21/4135 348/E5.103 |
| 2005/0192863 A1* | 9/2005 | Mohan | ..... | G06Q 30/02 705/14.27 |
| 2005/0209917 A1* | 9/2005 | Anderson | ..... | G06Q 30/0214 705/14.16 |
| 2005/0235321 A1* | 10/2005 | Ahmad-Taylor | ..... | H04N 21/47214 725/39 |
| 2006/0195359 A1* | 8/2006 | Robinson | ..... | G06Q 30/0236 705/14.19 |
| 2006/0224452 A1* | 10/2006 | Ng | ..... | G06Q 30/0242 705/14.27 |
| 2006/0256133 A1* | 11/2006 | Rosenberg | ..... | G06F 3/013 345/619 |
| 2007/0124756 A1* | 5/2007 | Covell | ..... | G06F 16/635 348/E7.071 |
| 2007/0130580 A1* | 6/2007 | Covell | ..... | G11B 27/034 725/18 |
| 2007/0139386 A1* | 6/2007 | Martin | ..... | G06F 3/04886 345/173 |
| 2007/0143778 A1* | 6/2007 | Covell | ..... | H04N 21/8133 725/135 |
| 2007/0165964 A1* | 7/2007 | Wolf | ..... | G06F 3/048 382/276 |
| 2007/0179850 A1* | 8/2007 | Ganjon | ..... | G06Q 30/00 705/14.27 |
| 2007/0192784 A1* | 8/2007 | Postrel | ..... | H04N 21/4316 725/23 |
| 2007/0214049 A1* | 9/2007 | Postrel | ..... | H04N 21/475 725/32 |
| 2008/0052062 A1* | 2/2008 | Stanford | ..... | G10L 15/26 704/E15.045 |
| 2008/0165141 A1* | 7/2008 | Christie | ..... | G06F 3/0482 345/173 |
| 2009/0198701 A1* | 8/2009 | Haileslassie | ..... | G06F 16/9535 |
| 2009/0313670 A1* | 12/2009 | Takao | ..... | H04N 21/47 725/110 |
| 2010/0034466 A1* | 2/2010 | Jing | ..... | G06F 18/214 382/195 |
| 2010/0114713 A1* | 5/2010 | Anderson | ..... | G06Q 20/10 705/14.69 |
| 2011/0037851 A1* | 2/2011 | Kim | ..... | G08C 23/04 348/143 |
| 2011/0085526 A1* | 4/2011 | Joseph | ..... | H04M 1/72415 455/556.1 |
| 2011/0202960 A1* | 8/2011 | Vaysman | ..... | H04N 21/4316 725/41 |
| 2011/0273455 A1* | 11/2011 | Powar | ..... | G11B 27/10 345/473 |
| 2011/0283189 A1* | 11/2011 | McCarty | ..... | H04N 21/4532 715/810 |
| 2012/0011545 A1* | 1/2012 | Doets | ..... | H04N 21/8153 725/38 |
| 2012/0076310 A1* | 3/2012 | DeBusk | ..... | G10L 25/48 381/56 |
| 2012/0124608 A1* | 5/2012 | Postrel | ..... | G06Q 30/0215 725/23 |
| 2012/0151525 A1* | 6/2012 | Demchenko | ..... | H04N 21/42208 345/173 |
| 2012/0191231 A1* | 7/2012 | Wang | ..... | G06F 16/7834 700/94 |
| 2012/0221131 A1* | 8/2012 | Wang | ..... | G06F 16/683 700/94 |
| 2012/0278825 A1* | 11/2012 | Tran | ..... | G06Q 30/04 725/13 |
| 2012/0284753 A1* | 11/2012 | Roberts | ..... | G06F 3/0488 725/47 |
| 2012/0295560 A1* | 11/2012 | Mufti | ..... | H04B 13/00 455/95 |
| 2012/0297400 A1* | 11/2012 | Hill | ..... | G06F 9/445 719/318 |
| 2012/0306929 A1* | 12/2012 | Chalkov | ..... | G06F 3/0488 345/173 |
| 2012/0311444 A1* | 12/2012 | Chaudhri | ..... | G11B 27/34 715/716 |
| 2012/0316969 A1* | 12/2012 | Metcalf, III | ..... | G06Q 30/0269 705/14.66 |
| 2012/0317240 A1* | 12/2012 | Wang | ..... | H04H 60/37 709/219 |
| 2013/0010204 A1* | 1/2013 | Wang | ..... | H04B 17/23 348/725 |
| 2013/0014155 A1* | 1/2013 | Clarke | ..... | G11B 27/105 725/32 |
| 2013/0029762 A1* | 1/2013 | Klappert | ..... | A63F 13/792 463/31 |
| 2013/0031579 A1* | 1/2013 | Klappert | ..... | H04N 21/812 725/32 |
| 2013/0042262 A1* | 2/2013 | Riethmueller | ..... | H04N 21/25866 725/14 |
| 2013/0044051 A1* | 2/2013 | Jeong | ..... | H04N 21/485 345/156 |
| 2013/0067512 A1* | 3/2013 | Dion | ..... | H04N 21/44224 725/32 |
| 2013/0073366 A1* | 3/2013 | Heath | ..... | G06Q 30/0261 705/14.25 |
| 2013/0073377 A1* | 3/2013 | Heath | ..... | G06Q 30/02 705/14.39 |
| 2013/0080242 A1* | 3/2013 | Alhadeff | ..... | G06F 16/957 705/14.39 |
| 2013/0080262 A1* | 3/2013 | Scott | ..... | G06Q 30/02 705/14.68 |
| 2013/0085828 A1* | 4/2013 | Schuster | ..... | G06Q 30/0207 705/14.39 |
| 2013/0111519 A1* | 5/2013 | Rice | ..... | G06Q 30/02 725/34 |
| 2013/0124073 A1* | 5/2013 | Ren | ..... | G08G 1/00 701/118 |
| 2014/0137139 A1* | 5/2014 | Jones | ..... | H04N 21/458 725/18 |
| 2014/0214532 A1* | 7/2014 | Barton | ..... | G06Q 30/0251 705/26.62 |
| 2014/0278845 A1* | 9/2014 | Teiser | ..... | H04N 21/812 705/14.4 |
| 2015/0095946 A1* | 4/2015 | Kim | ..... | H04N 21/4784 725/34 |
| 2015/0143416 A1* | 5/2015 | Onno | ..... | H04N 21/8358 725/34 |

(56) References Cited

U.S. PATENT DOCUMENTS

| | | | |
|---|---|---|---|
| 2017/0150227 A1* | 5/2017 | Kim | G06Q 20/326 |
| 2017/0201801 A1* | 7/2017 | Jiang | H04N 21/4221 |
| 2019/0306543 A1 | 10/2019 | Gang et al. | |
| 2020/0267421 A1* | 8/2020 | Gang | H04N 21/235 |
| 2022/0191559 A1 | 6/2022 | Gang et al. | |

* cited by examiner

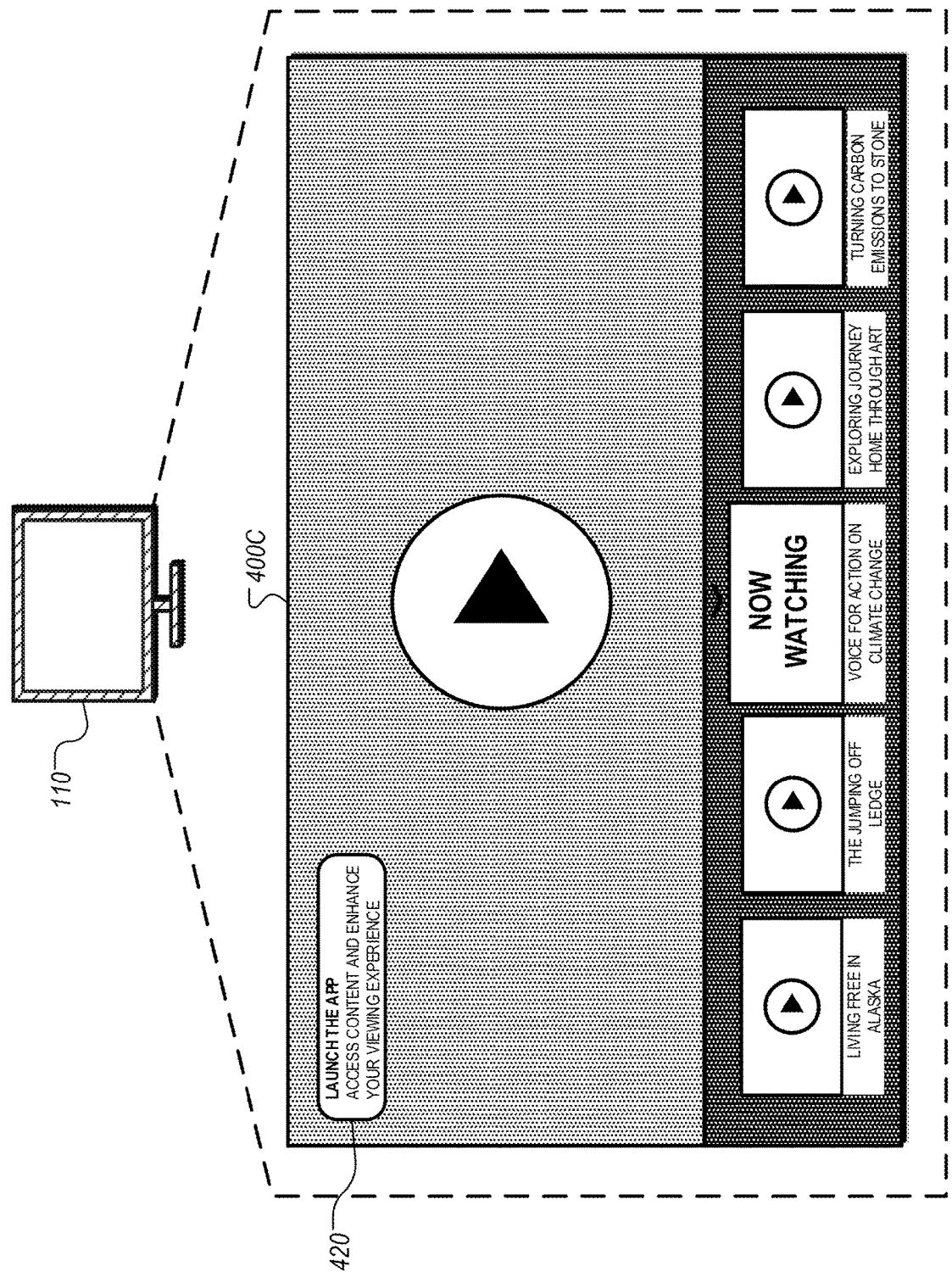

TIME-BASED CONTENT SYNCHRONIZATION

CROSS-REFERENCE TO RELATED APPLICATIONS

This application is a continuation of, and claims priority to, U.S. application Ser. No. 17/460,800, filed Aug. 30, 2021, now allowed, which is a continuation of, and claims priority to, U.S. application Ser. No. 16/865,468, filed May 4, 2020, now U.S. Pat. No. 11,109,078, which is a continuation of, and claims priority to, U.S. application Ser. No. 16/382,563, filed Apr. 12, 2019, now U.S. Pat. No. 10,645,431, which is a continuation of, and claims priority to, U.S. application Ser. No. 15/703,428, filed Sep. 13, 2017, now U.S. Pat. No. 10,264,297, the entire contents of which is hereby incorporated by reference.

BACKGROUND

Advances in mobile device and communications technologies have increased the number of avenues of user Internet access and media consumption. Users now interact with web content using applications running on a variety of different communication devices, e.g., smart phones, personal computers, personal digital assistants (PDAs), etc., and are doing so with increasing regularity.

SUMMARY

Multimedia systems often provide users with access to secondary content while viewing or accessing primary content. For example, some systems provide users with access to metadata of actors when watching a movie that includes the actors. However, such systems often provide access to secondary content in a static and often unengaging manner. For example, while secondary content can generally be associated with metadata of the primary content, multimedia systems often do not present secondary content at specific time points within the playback of the primary content. Moreover, the presentation of secondary content can often interfere with the user's viewing experience of the primary content because a user may become preoccupied with the secondary content during time points of the primary content that demand a user's attention.

In some implementations, a content management system (CMS) is capable of addressing these and other limitations of such multimedia systems by dynamically associating content streams to improve a user's viewing experience while accessing primary content. To accomplish this, the CMS uses content association data assigning secondary content items to the primary content. Secondary content items can be assigned to designated frames of the primary content so that the secondary content items are presented to user at specified time points during the playback of the primary content. Secondary content items can represent content that is related to the subject matter of the primary content, or content that a user may be interested in accessing while viewing the primary content.

For example, a secondary content item can represent a news article about a factual event that is referenced in a primary content that is fictional movie. In this example, the CMS generates and applies content association data that assigns the news article to a designated frame within the movie that references the factual event. Once the playback of a movie reaches the designated frame, a user is provided with access to the news article on one or more electronic devices. In this regard, the content association data can be used provide the user with access to relevant content in a more intuitive and interactive manner.

The CMS is capable of dynamically adjusting the content association data for a single primary content to customize a viewing experience for different users or for different sessions by the same user. For example, the CMS can obtain context data collected through a user device to predict a context of a user when he/she accesses the primary content. The CMS can then dynamically generate the content association data for the primary content based on predicted context of the user. In this example, a user may be presented with different collections of secondary content items and/or at different time points within the primary content when, for instance, viewing the same primary content during daytime and nighttime.

In another example, the CMS may use user-specific data, such as user preferences or user activity data to customize the content association data for a specific set of user attributes. In this example, different users accessing the same primary content may be presented with different collections of secondary content items and/or at different time points within the primary content. In this regard, the CMS is capable of using context data and/or user-specific data to adjust both the selection of secondary content items that are presented to a user and the time points within the playback of the primary contents during which selected secondary content items are presented to the user.

The CMS can present the secondary content on a device being used to access the primary content, or alternatively, on another device that is associated with the user and is likely to be accessible to the user when viewing the primary content. In implementations where the same device is used to present content, the CMS may display unobtrusive notifications identifying the secondary content on a screen while the primary content is presented on the screen. In other implementations, the CMS can identify a second device that is likely to be accessed by the user when viewing the primary content on a first device. In such implementations, the secondary content items are presented through the second device instead of the first device.

The architecture of the system provides various improvements in displaying associated content when a user is viewing primary content. As an example, because the content association data can assign secondary content to designated frames of the primary content, the CMS is capable of dynamically presenting associated content specified time points when a user is most likely to be interested in viewing the associated content. As another example, the CMS can customize the content association data towards the preferences and/or context of the user such that associated content is provided in a manner that is both unobtrusive to the user's viewing experience and likely to supplement and/or improve the user's overall viewing experience.

In one general aspect, a method includes the operations of: obtaining, by a server system, data indicating that a primary content is accessed on a computing device; generating, by the server system, content association data for the primary content, the content association data specifying (i) one or more designated frames of the primary content, and (ii) one or more secondary content items assigned to each of the one or more designated frames; determining, by the server system, that the computing device accessed a particular frame from among the one or more designated frames; and in response to determining that the computing device is accessing the particular frame, providing, by the server system and for output to one or more computing devices, an instruction to display a communication that includes the one or more secondary content items assigned to the particular frame within the content association data.

One or more implementations can include the following optional features. For example, in some implementations, the method further includes the operation of determining, by the server system, a predicted context associated with a user of the computing device. In such implementations, generating the content association data for the primary content includes: selecting a secondary content item that is determined to be associated with the predicted context associated with the user; and assigning the secondary content item to a designated frame from among the one or more designated frames of the primary content.

In some implementations, the method further includes the operation of obtaining data indicating a set of user attributes for a user of the computing device accessing the primary content being played on the computing device. In such implementations, generating the content association data for the primary content includes: selecting a secondary content item that is determined to be associated with the set of user attributes; and assigning the secondary content item to a designated frame from among the one or more designated frames of the primary content.

In some implementations, the communication is provided for output to a second computing device that is within a threshold proximity to the computing device.

In some implementations, the computing device is a stationary display device, and the second computing device is a mobile device.

In some implementations, the computing device runs a first operation system, and the second computing device runs a second operating system that is different from the first operating system.

In some implementations, the method further includes the operations of: determining, by the server system, one or more additional computing devices that are (i) likely to be used by a user of the computing device during a time period in which the primary content is accessed on a computing device, and (ii) connected to a local area network of the computing device; selecting, by the server system, a particular computing device from among the one or more additional computing devices. In such implementations, the instruction is provided to the selected computing device.

In some implementations, the method further includes the operation of determining, by the server system and for each of the one or more additional computing devices, a respective likelihood that a computing device is used by a user of the computing device during a time period in which the primary content is accessed on a computing device. In such implementations, the particular computing device is selected from among the one or more computing devices based on the determined likelihoods.

Other implementations of this and other aspects include corresponding methods, apparatus, and computer programs, configured to perform the actions of the systems, encoded on computer storage devices.

The details of one or more implementations are set forth in the accompanying drawings and the description below. Other features will be apparent from the description and drawings.

BRIEF DESCRIPTION OF THE DRAWINGS

FIGS. 4A-D illustrate examples of user interfaces that are provided to different users.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1A:
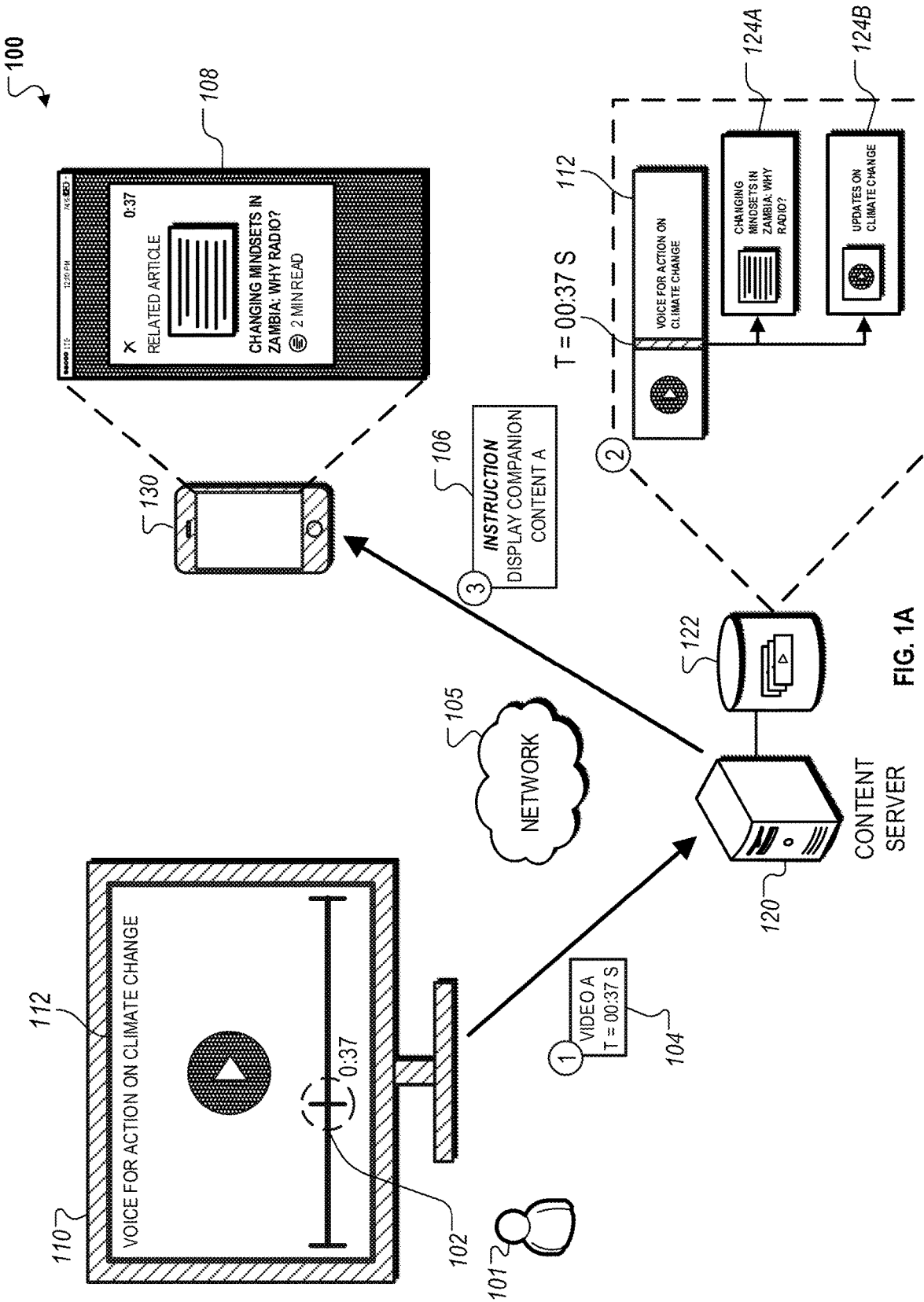
FIGS. 1A-B illustrate an example of a CMS that is capable of using content association data to dynamically associate content at specified time points.

In general, this document describes a CMS that is capable of dynamically associating content streams to improve a user's viewing experience while accessing primary content. To accomplish this, the CMS uses content association data assigning secondary content items to the primary content. Secondary content items can be assigned to designated frames of the primary content so that the secondary content items are presented to user at specified time points during the playback of the primary content. Secondary content items can represent content that is related to the subject matter of the primary content, or content that a user may be interested in accessing while viewing the primary content.

For example, a secondary content item can represent a news article about a factual event that is referenced in a primary content that is fictional movie. In this example, the CMS generates and applies content association data that assigns the news article to a designated frame within the movie that references the factual event. Once the playback of a movie reaches the designated frame, a user is provided with access to the news article on one or more electronic devices. In this regard, the content association data can be used provide the user with access to relevant content in a more intuitive and interactive manner.

As described throughout, a "content" refers to any form of digital multimedia. Content can include multimedia files that are accessed from computer-readable media, data that is streamed over a network medium, or data that is transmitting over a broadcasting medium. Examples of content described throughout this document can include textual content, audible content, e.g., music, and visual content, e.g., images or video. A user can access content using any suitable electronic device through any suitable means such as from a tangible medium, through a network medium, or a broadcasting medium. In some implementations, content is presented to a user through an application running on an electronic device.

As described throughout, "primary content" refers to content that is accessed by a user and during which another piece of content is provided to the user. For example, primary content can refer to a movie that is playing when content assigned to a particular scene within the movie is provided to the user. As another example, primary content can refer to a song that is playing when content assigned to a chorus of the song is provided to the user.

As described throughout, "secondary content items" refer to content that is provided to the user during specified time points of the playback of the primary content. As discussed below, a secondary content item can be assigned to a particular frame of the primary content such that the secondary content item is provided to the user when playback of the primary content reaches the particular frame. Examples of secondary content items include news articles, video clips, audio segments, textual messages, hyperlinks, among others.

As described throughout, "real-time" refers information or data that is collected and/or processed instantaneously with minimal delay after the occurrence of a specified event, condition, or trigger. For instance, "real-time data" refers to data, e.g., content association data, playback data, context data, etc., that is processed with minimal delay after a computing device collects or senses the data, e.g., using accelerometers, gyroscopes, magnetometers, etc. The minimal delay in collecting and processing the collected data is based on a sampling rate or monitoring frequency of the computing device, and a time delay associated with processing the collected data and transmitting the processed data over a network. As an example, a computing device on which primary content is being accessed may collect data representing playback progression of the primary content every second and transmit the collected data to a server system as network data packets. The server system processes each received network data packet to monitor the progression of playback of the primary content to determine when computing devices access a designated frame of the primary content. In response to determining that the designated frame has been accessed, the server system transmits an instruction to the computing device to display a communication that includes secondary content items assigned to the designated frame. In this example, each of the processing operations can be performed in real-time to minimize the delay between a time point when the designated frame is accessed and a time point when the communication including the secondary content items are provided for output to the user.

Figure 1B:
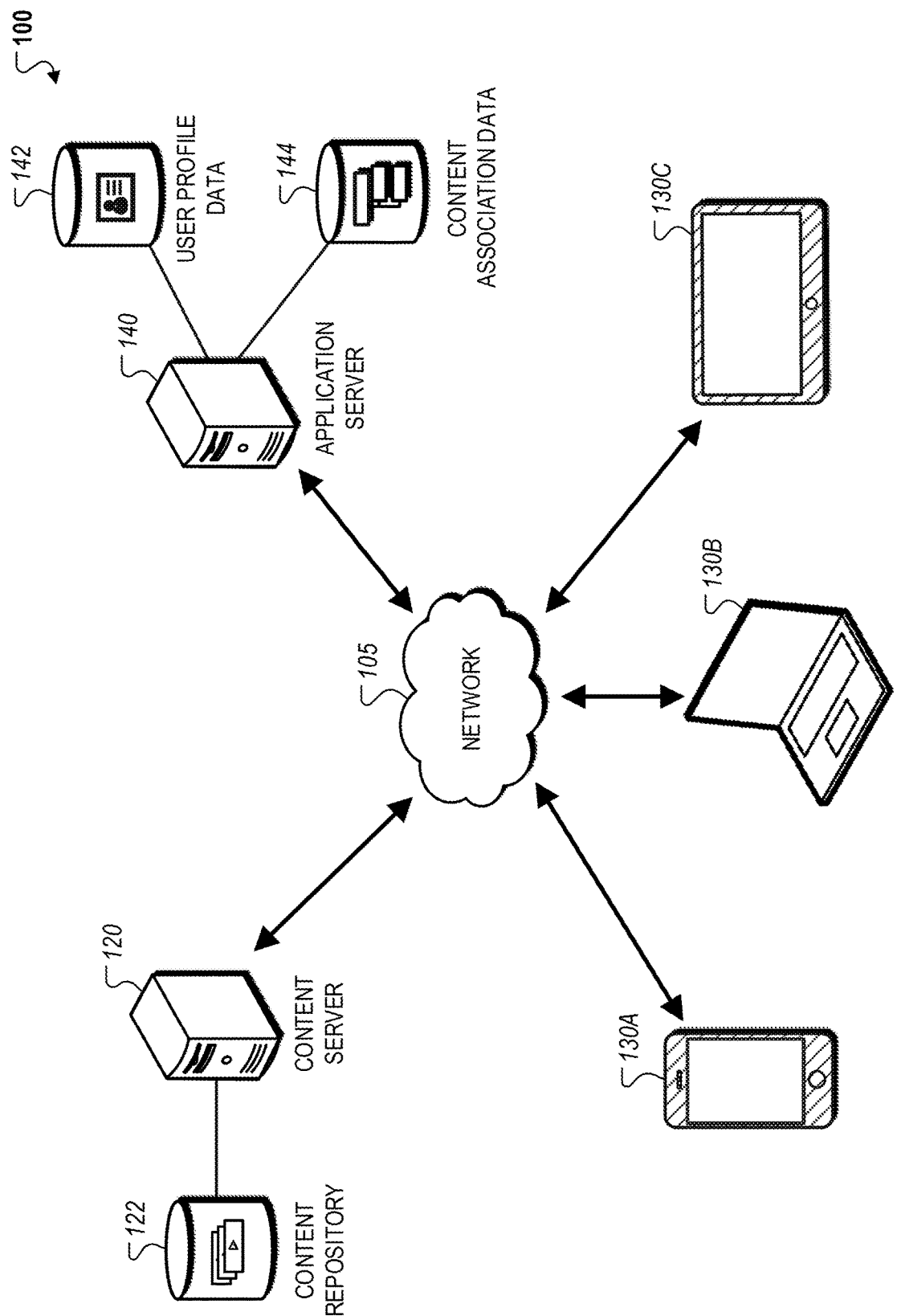

FIGS. 1A-B illustrate an example of a CMS 100 that is capable of using content association data to dynamically associate content at specified time points. The CMS 100 includes a computing device 110, a server system 120, and a computing device 130. The server system 120 generates and stores content association data 122 in an associated repository as discussed in detail below. FIG. 1A illustrates an example of a technique used by the system 100 to display a secondary content item 124A during a time period when the user 101 accesses primary content 112 on the computing device 110. FIG. 1B illustrates an architecture of the components of the system 100.

Referring initially to FIG. 1A, the system 100 uses the depicted technique to provide the user 101 with access to secondary content on the computing device 130 while accessing primary content 112 on the computing device 110. In this example, the computing device 110 represents a device with a large screen such as a television and the computing device 130 represents a mobile device such as a smartphone or a tablet computing device. The system provides secondary content within a communication 132 at a specified time point 102 within the playback of the primary content 112.

The example depicted in FIG. 1A associates primary content 112 and secondary content items 124A and 12B based on the content of the primary content 112, although other types of content associations can also be used. In the depicted example, primary content 112 is a video titled "VIDEO FOR ACTION ON CLIMATE CHANGE," which is related to topics "AFRICA" and "CLIMATE CHANGE." The secondary content items 124A and 124B are content that also relate to these topics. For example, the secondary content item 124A is an article titled "CHANGING MINDSETS IN ZAMBIA: WHY RADIO" relating to the topic "AFRICA" whereas the secondary content item 124B is a video titled "UPDATES ON CLIMATE CHANGE" relating to the topic "CLIMATE CHANGE."

Referring in more detail to the technique depicted in FIG. 1A, the content association data 122 associates a secondary content item 124A to a frame 112a of the primary content 112. The frame 112A corresponds to a time point 102 within the playback of the primary content 112 on the computing device 110. In this regard, when playback of the primary content 112 reaches the time point 102, as depicted in FIG. 1A, the CMS 100 begins dynamically associating the primary content 112 to the secondary content item 124A as discussed below. Although this example depicts the primary content 112 and the secondary content item 124A being provided to the user 101 on different devices, in some implementations, the CMS might alternatively provide the secondary content item 124A on the same device, e.g., the computing device 110.

The server system 120 initially generates content association data 122. In this example, the content association data 122 is generated prior to initiating playback of the primary content 112 on the computing device 110. Once initiated, the server system 120 monitors the playback of the primary content 112 on the computing device 110.

In some implementations, instead of generating the content association data 122 prior to playback of the primary content 112, as discussed above, the server system 120 instead is capable of dynamically generating the content association data after playback of the primary content 112 has initiated on the computing device 110. In such implementations, the server system 120 can use, for example, activity data collected by the computing device 110 and/or other devices such as the computing device 130, to adjust the generation of the content association data 122. The server system 120 can dynamically select the secondary content items and/or the frames of the primary content to assign to the selected secondary content items based on the received activity data. Dynamic generation of the content association data is discussed in more detail with respect to FIGS. 3A-B.

The server system 120 obtains playback data 104 from the computing device over the network 105. As depicted in FIG. 1A, the playback data 104 indicates that playback of the primary content 112 has reached the time point 102, e.g., at "00:37 S," which corresponds to the designated frame 112A within the content association data 122. As shown, the designed frame 112A is assigned to the secondary content item 124A.

In response to receiving the playback data 104, the server system 120 selects the secondary content item 124A to provide to the computing device 130. In this example, the server system 120 automatically selects the secondary content item 124A since the designated frame is assigned to the designated frame 112A.

In some implementations, multiple secondary content items are assigned to the designated frame 112A. In such implementations, the server system 120 may either provide each of the multiple secondary content items to the client device 130, or provided a selected subset of the multiple content items. The selection can be based on, for example, based on data received from the computing devices 110 and 130, e.g., context data or user-specific data.

In some implementations, multiple secondary content items assigned to the designated frame 112A can represent alternative forms of the same content, e.g., a text transcription of a conversation, audio data encoding utterances of the conversation, and video data depicting characters having the conversation. In such implementations, the server system 120 can select one of the multiple secondary content items based on determining which form would be the most appropriate to provide for output. This determination can be based on the predicted context of the user, information associated with the primary content 110, or interaction data of the user collected by computing devices 110 and 130. As an example, activity data of the user 101 collected on the computing device 130 while he/she accesses the primary content 110 on the computing device 110 can be used to by the server system 110 to determine the secondary content to select and provide for output on the computing device 130. In this example, if the activity data indicates that the user 101 is actively using the computing device, then a less disruptive form of secondary content may be selected and provided, e.g., a text notification, instead of a potentially more disruptive form of secondary content, e.g., video display.

The server system 130 generates an instruction 106 to provide for output to the computing device 130. The instruction 106 identifies a type of communication to provide for output on the client device 130, and the secondary content selected by the server system 120 to include in the communication. The different communication types can include a text message, an operating system notification, an in-app pop-up notification, an email, among others. Additionally, the content can be included in the communication using various techniques.

The client device 130 receives the instruction 106, and in response, provides a communication 108 for output to the user 101. In the example depicted in FIG. 6, the communication 108 is a notification that includes a snippet of content that includes to a hyperlink to a web location of the secondary content 124A that, upon selection by a user input, directs the user 101 to a uniform resource locator (URL) associated with a web location of the secondary content 124A. In other implementations, the communication 108 can includes other types of references to the secondary content 124A such as text-based or image-based snippets, user recommendations or suggestions, among others.

In some implementations, content server 120 stores device association data, e.g., in the repository 122, that can be used to enable the computing device 110 and/or the computing device 130 to identify one another in relation to playback of the primary content 112 or the display of the communication 108. In some instances, the device association data is generated based a user manually pairing devices that are connected over the LAN within a property. Device information collected from the pairing is then stored within the device association data. In other instances, instead of manually pairing two devices, a user instead provides login information, e.g., a username and password, to authenticate to each device to be paired. In such instances, the device association data is assigned to a user account and is updated to include device information of each device that the submits login information for authentication. In some other instances, two devices connected over the same LAN can be explicitly paired with the user of a temporary activation code made available to a device to be paired and through a device that's already associated with the content server. For example, a device to be paired can receive an activation code that the user provides on an existing paired device to associate the device to be paired with the user's account.

In some implementations, multiple display devices are available to access the primary content 112. For instance, a user may have multiple display devices within a vicinity of one another, e.g., within the same room, that are each capable of displaying the primary content 112. In such implementations, the content server 120 can be capable of using techniques to select a particular device from among the multiple display devices to provide the primary content 112 for accessing by the user 101. For example, the prior to initiating playback of the primary content 112, the content server 120 may transmit a communication to one or more of the devices being used by the user to confirm which did play device will be used to access the primary content 112.

Alternatively, in some implementations, where the system is capable of monitoring location and position data of a computing device of the user, such as a smart phone, the monitoring location and position data can be used to automatically select a display device that is determined to be closest to the user. For example, the system 100 can include beacons placed in different regions of a property, e.g., a corporate office. In this example, a connection event between a beacon and user's mobile device can be used to identify a user's location within the property. The identified location can then be cross-referenced with map data indicating known locations of display devices, and selecting the display device that is the closest to the user's identified location.

In some implementations, the communication 108 that includes secondary content items can be provided in one or more of an augmented reality (AR), virtual reality, and/or a mixed reality computing environment. For example, a secondary content item can be presented as a graphical element that is displayed through, for instance, a smart phone camera's field of view at a specified time within the playback of the primary content 112 as discussed above. In another example, if the primary content 112 represents VR content provided through a head-mounted device (HMD), then the secondary content can represent a three-dimensional virtual object that is generated within the spatial environment of the VR content. The secondary content items that can be generated within AR and VR environments can represent two-dimensional content that is adjusted for AR and VR environments, e.g., snippets placed inside a three-dimensional object container, or alternatively, three-dimensional object representing virtual object, characters or other types of graphics.

Referring now to FIG. 1B, an example of an architecture for components of the system is depicted. The depicted architecture generally enables the system 100 to dynamically associate primary content to secondary content items. As discussed above, in some implementations, content associations can be determined in real-time, e.g., prior to or during playback of the primary content. The associations are specified within the content association data 122 and applied during playback of the primary content to provide associated secondary content items to, for example, computing devices 130A-C.

In the example depicted in FIG. 1B, the system 100 includes server systems 120A-B and multiple client devices 130A-C that exchange communications over the network 105. In this example, a content provider that provisions content to users can manage the server system 120A, and a third-party entity that is authorized by the content provider to distribute content produced by the content provider manages the server system 120B.

The server system 120A includes a content repository 152 for storing content to be provisioned to users over the network 105. In particular, the content repository 152 can store primary content and secondary content items, and metadata associated with the stored content. Content can be stored within the content repository 152 in an unassociated manner, e.g., without content associations between primary content and secondary content items, or alternatively, in an indexed format where classification labels are assigned to primary content and secondary content items. When stored in an indexed format, primary content and secondary content items that relate to certain topics or subjects can be identified using the classification labels. For example, content can be classified with a "HORROR" genre to enable association of primary content and secondary content items that both relate to the same genre.

The server system 120B stores user profile data 154 and content association data 156. In some instances, the content association data 156 can correspond to the content association data 122 depicted and discussed above with respect to FIG. 1A. The user profile data 154 includes, for example, user account data, user activity data, e.g., social media activity, prior search queries, location data, etc., and/or user preferences. As discussed above, the content association data 156 can be pre-generated before primary content is accessed by a user, or alternatively, dynamically generated at a time point when the primary content is accessed or during playback of the primary content.

In some implementations, the server system 120 uses the user profile data 154 to dynamically generate, and/or customize the generation of, the content association data 156. For example, as discussed in detail with respect to FIGS. 3A-B, the content association data 156 can be generated based on a predicted user context and/or a set of user-specific attributes indicated within the user profile data 154.

In some implementations, such as the example depicted in FIG. 1A, the server systems 120A and 120B can be combined into a single server system that performs the combined operations of the server systems 120A and 120B. In such implementations, a single server system can be used to store and periodically update the content repository 152, the user profile data 154, and the content association data 156.

The computing devices 130A-C can each be any type of electronic computing device that is associated with a display and is capable of presenting content that is accessed by a user. For example, the computing devices 130A-C can be one or more of a smartphone, a laptop computing device, a desktop computing device, or any other type of display-based device.

In some instances, the computing devices 130A-C include devices that are associated with a single user and are, for example, connected to the same local area network (LAN). The computing devices 130A-C, in such instances, can represent devices that are located nearby one another and accessible to the user when accessing the primary content. For example, a user can access primary content on the computing device 130A while accessing secondary content items 130B on either the computing devices 130B and/or 130C. In this example, the computing device 130A is a computing device with a large display, such as a television, and the computing devices 130B and 130C are mobile devices, such as a smartphone or a tablet computing device.

In other instances, the computing devices 130A-C include devices that are associated with multiple users that access the same primary content stored within the content repository 152. In such instances, each of the computing devices 130A-C may receive different content association data that is customized for the corresponding user. For example, the content association provided to the computing devices 130A-C can vary with respect to the secondary content items associated with the primary content and/or the designated frames of the primary content that are assigned to the secondary content items.

Figure 2:
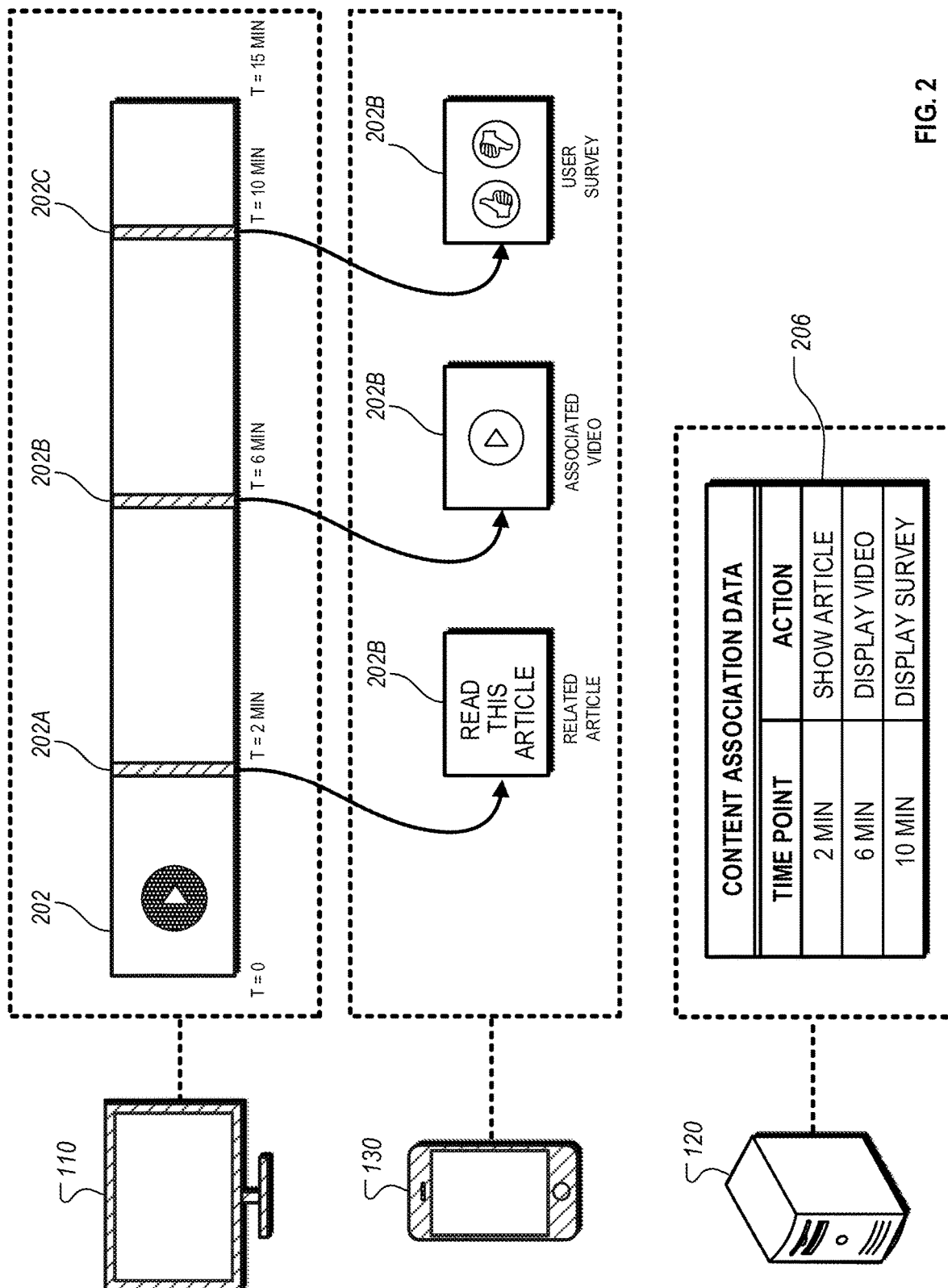
FIG. 2 illustrates an example of a technique for associating frames of primary content to secondary content items.

FIG. 2 illustrates an example of a technique for associating frames of primary content to secondary content items. As depicted, the server system 202 generates content association data 202 and distributes it to the computing devices 110 and 130 during playback of primary content 204 on the computing device 110. In this example, the content association data 202 assigns secondary content items 206A, 206B, and 206C respectively to designated frames 204A, 204B, and 204C of the primary content 204.

Each of the designated frames 204A-C correspond to a specified time point within playback of the primary content 204. As depicted, primary content 204 is a video with a 15-minute duration. In this example, designated frames 204A-C correspond respectively to time points represented by two-minute progression into the video, six-minute progression into the video, and ten-minute progression into the video.

The secondary content items 206A-C are each presented on the computing device 130 as playback of the primary content 204 progresses. For example, communications including the secondary content items 206A-C are provided respectively to the client device 130 at the two-minute, six-minute, and ten-minute progression points into the primary content 204. Each communication can be provided on the computing device 130 for a particular time period specified by the content association data or until a user provides an input to dismiss the presented communication. For example, the communications including the secondary content items 206A-C are provided respectively for ten seconds, five seconds, and thirty seconds. In some implementations, the duration of a presented communication can be determined based on the content type of the secondary content item included in the communication. For example, a communication that includes a hyperlink can be presented for a shorter time period compared to a communication that includes a large text segment.

Figure 3A:
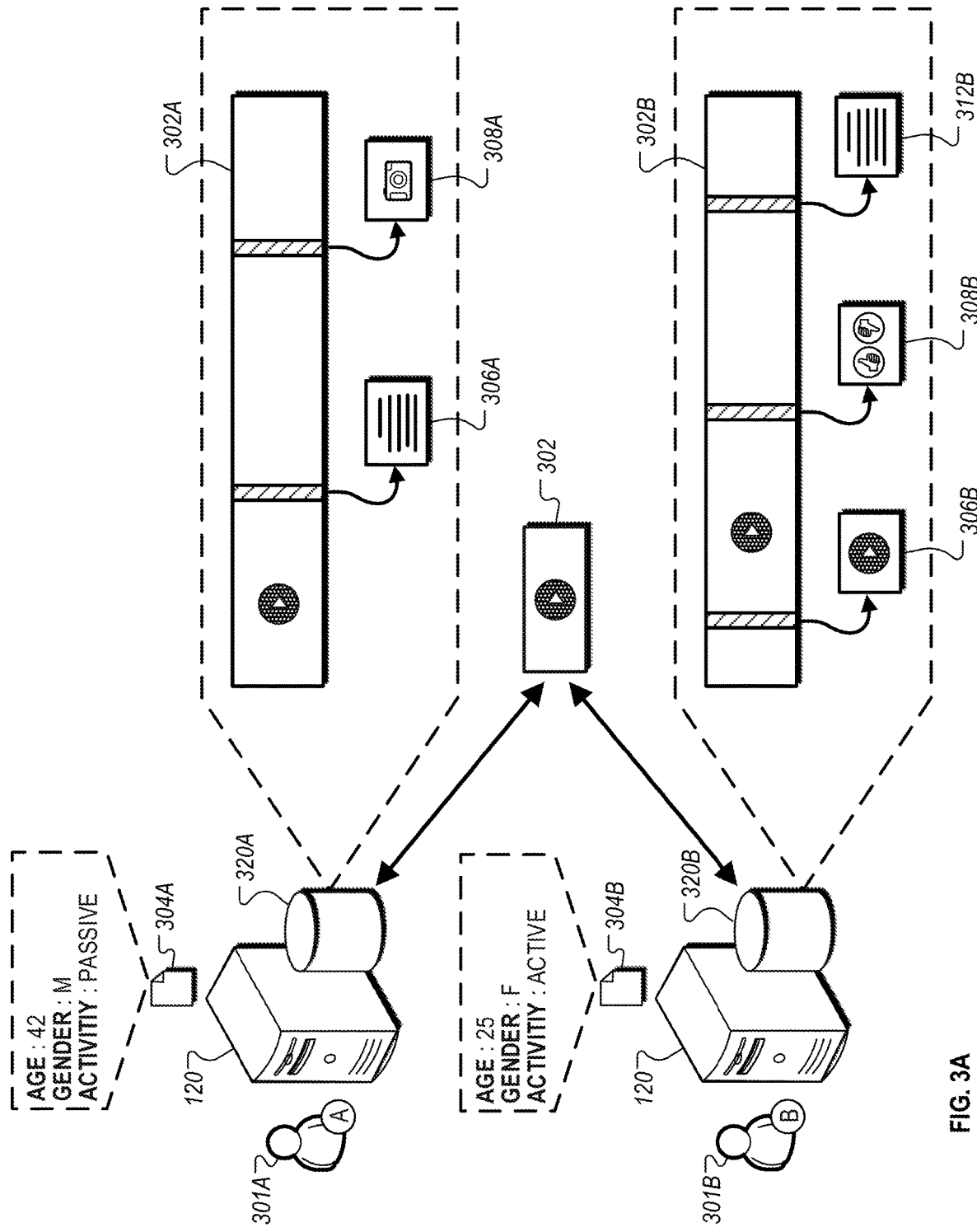
FIG. 3A-B illustrates examples technique for customizing content association data of primary content.
Figure 3B:
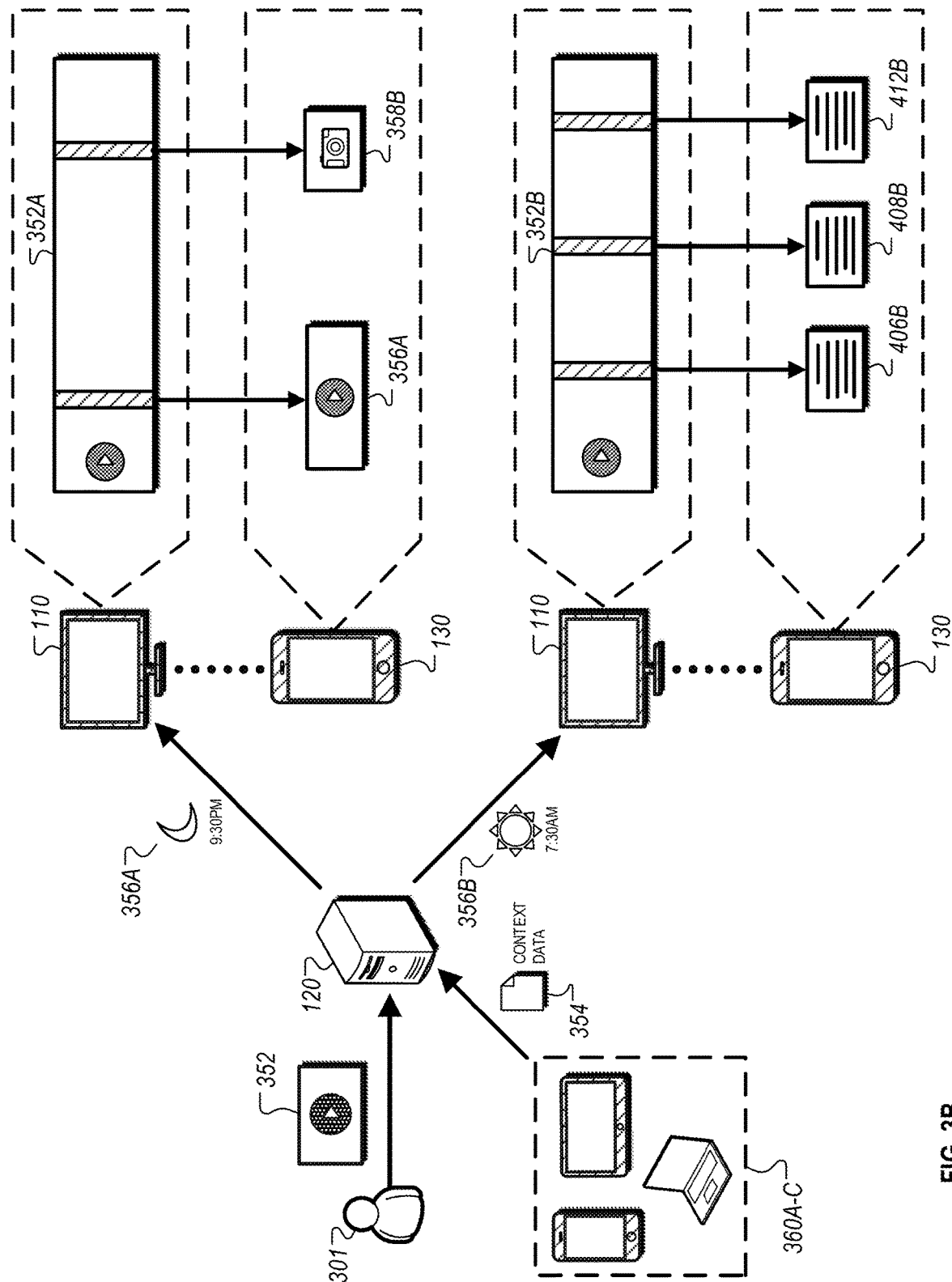

FIG. 3A-B illustrates examples of techniques for customizing content association data of primary content. Referring initially to FIG. 3A, an example of a technique for customizing content association data of primary content for different users is depicted. In the example depicted, the server system 120 generates different content associations for two users 301A and 301B that access the same primary content, e.g., primary content 302 stored within a content repository. In this example, the server system 120 generates the content associations based on information contained in user data 304A and 304B received from computing devices 130A and 130B, respectively.

As depicted in FIG. 3A, the server system 120 generates content association data that specifies different designated frames for the primary content 302 and assigns different secondary content items to each of the designated frames. In this regard, the server system 120, in this example, uses the content association data to customize each user's viewing experience of the primary content 302.

For example, with respect to the user 301A, the server system 120 generates content association data 320A based on the user data 304A. The content association data 320A specifies designated frames 306A and 308A for the primary content 302. The content association data 320A also assigns secondary content items 312A and 314A to the designated frames 306A and 308A, respectively. With respect to the user 301B, the server system 120 generates content association data 320B based on the user data 304B. The content association data 320B specifies designated frames 306B, 308B, and 312B for the primary content 302. The content association data 320B also assigns secondary content items 314B, 316B, and 318B to the designated frames 306B, 308B, and 312B, respectively.

As depicted in FIG. 3A, the user data 304A and 304B vary with respect to, for example, user attributes of each corresponding user. For example, the user data 304A indicates that the user 301A is a 42-year old male whose historical user activity indicates a preference for passive types of interaction, e.g., viewing and accessing content. In the other example, the user data 304B indicates that the user 301B is a 25-year old female whose historical user activity indicates a preference of active types of interaction, e.g., sharing content over a social media network.

In the example depicted in FIG. 3A, the server system 120 generates different content associations for each user based on the different user attributes identified within the user data 304A and 304B. For instance, the content association data 320A identifies three secondary content items (instead of two as specified in content association data 320B), and designates different frames of the primary content 302 corresponding to different events. In the first instance, the content association data 320A includes passive viewing content, such as a related article and an image, that is more likely to be accessed by the user 301A based on his user attributes. In contrast, in the second instance, the content association data 320B includes active viewing content, such as interactive video and a user survey, that are is more likely to be accessed by the user 301B. In this regard, the server system 120 customizes the selection of secondary content items based on user attributes identified within the user data 304A and 304B.

In some implementations, the server system 120 can customize the selection of designated frames and/or secondary content items based on other types of user attributes. As an example, a user's historical activity while watching different types of content to determine if a user frequently pauses and resumes playback while accessing primary content. In this example, users that have a history of high frequency of pausing/resuming playback can be provided with content association data with a larger number of designated frames compared to users have a history of low frequency of pausing/resuming playback.

As another example, the genres of content frequently accessed by a user can be used to predict a user's preference for types of content and/or his/her attention level at different time points within primary content. For instance, if a user often watches horror movies, then secondary content items may be more frequently presented when the user watches primary content that is classified as a horror movie. A user that does not frequently watch horror movies, however, is not presented the same number of secondary content items when he/she watched the same primary content.

Referring now to FIG. 3B, an example of a technique for customizing content association data of primary content for different predicted contexts of a single user is depicted. In the example, the server system 120 generates different content associations for two different predicted contexts 356A and 356B for a user 301 when he/she accesses the same primary content, e.g., primary content 352. In this example, the server system 120 generates different content associations for each predicted context based on information contained in context data 354 received from computing devices 360A-C of the user 301.

The computing devices 360A-C can represent computing devices that are nearby the user 301 when he/she accesses the primary content 352. For example, the computing devices 360A-C can include one or more of a smartphone, a tablet computing device, and a laptop that are accessed by the user 301 during the playback of the primary content 352. The context data 354 can identify, for example, a location of the user, a current date and time, applications that are actively being accessed by the user 301, social media activity, or other types of user activity data. The server system 120 processes the information contained within the context data 354 to identify and/or predict present circumstances of the user 301 while accessing the primary content 352 that may impact the likelihood that the user 301 will access secondary content items.

In the examples depicted in FIG. 3B, the server system 120 generates different content associations for the primary content 352 based on the time of day that the user 301 accesses the primary content 352. For instance, as shown, the different content associations specify different designated frames for the primary content 352 and assign different secondary content items to each of the designated frames. In this regard, the server system 120, in these examples, uses the different content associations to customize the user's viewing experience of the primary content 402 based on when he/she accesses the primary content 352.

With respect to the predicted context 356A, the server system 120 generates content association data 360A based on the context data 354. The content association data 360A specifies designated frames 362A and 364A for the primary content 352. The content association data 356A also assigns secondary content items 372A and 374A to the designated frames 362A and 364A, respectively. With respect to the predicted context 356B, content association data 360B specifies designated frames 362B, 364B, and 366B for the primary content 402. The content association data 360B also assigns secondary content items 372B, 374B, and 376B to the designated frames 362B, 364B, and 366B, respectively.

In the first example, the server system 120 determines that the predicted context 356A indicates that the user 301 accesses the primary content 352 in the nighttime at 9:30 PM. In this example, the server system 120 selects secondary content of a visual type, such as a video and an image, because the user 301 is likely have more time to view secondary content and because historical user activity logs indicate that he/she prefers to watch videos at night before sleeping.

Alternatively, in the second example, the server system 120 determines that the predicted context 356A indicates that the user 301 accesses the primary content 352 in the morning time at 7:30 AM. Compared to the first example, the server system 120, in this example, selects textual content, such as articles, because the user 301 is predicted to have limited time to access the secondary content and because historical user activity logs indicate that he/she regularly reads online news articles in the morning. For example, the server system 120 may determine that the user 301 may have a shorter attention span in the morning time for secondary content relative to the evening or nighttime because he/she may be preparing to commute to work or school.

Figure 4A:
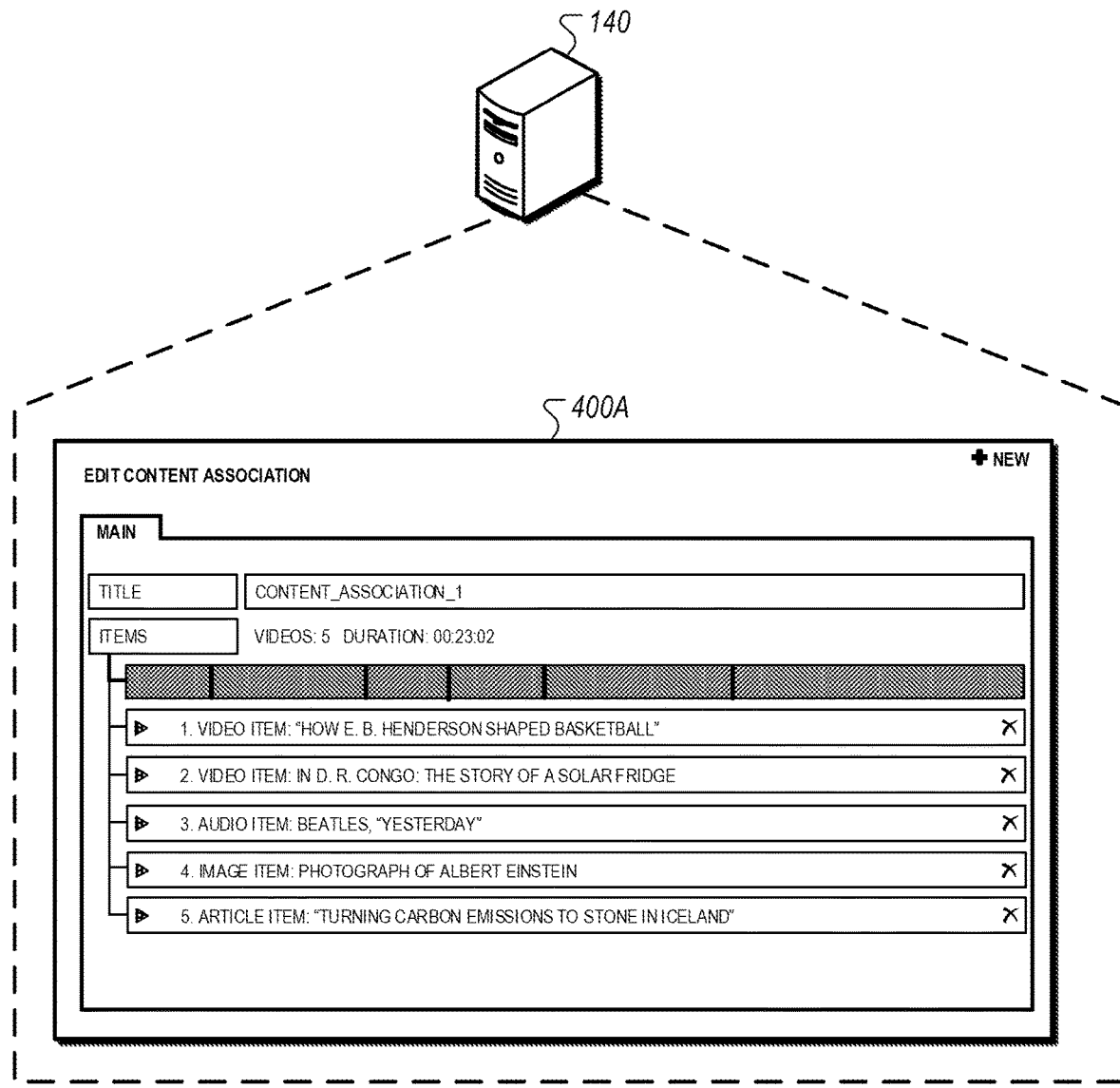
Figure 4B:
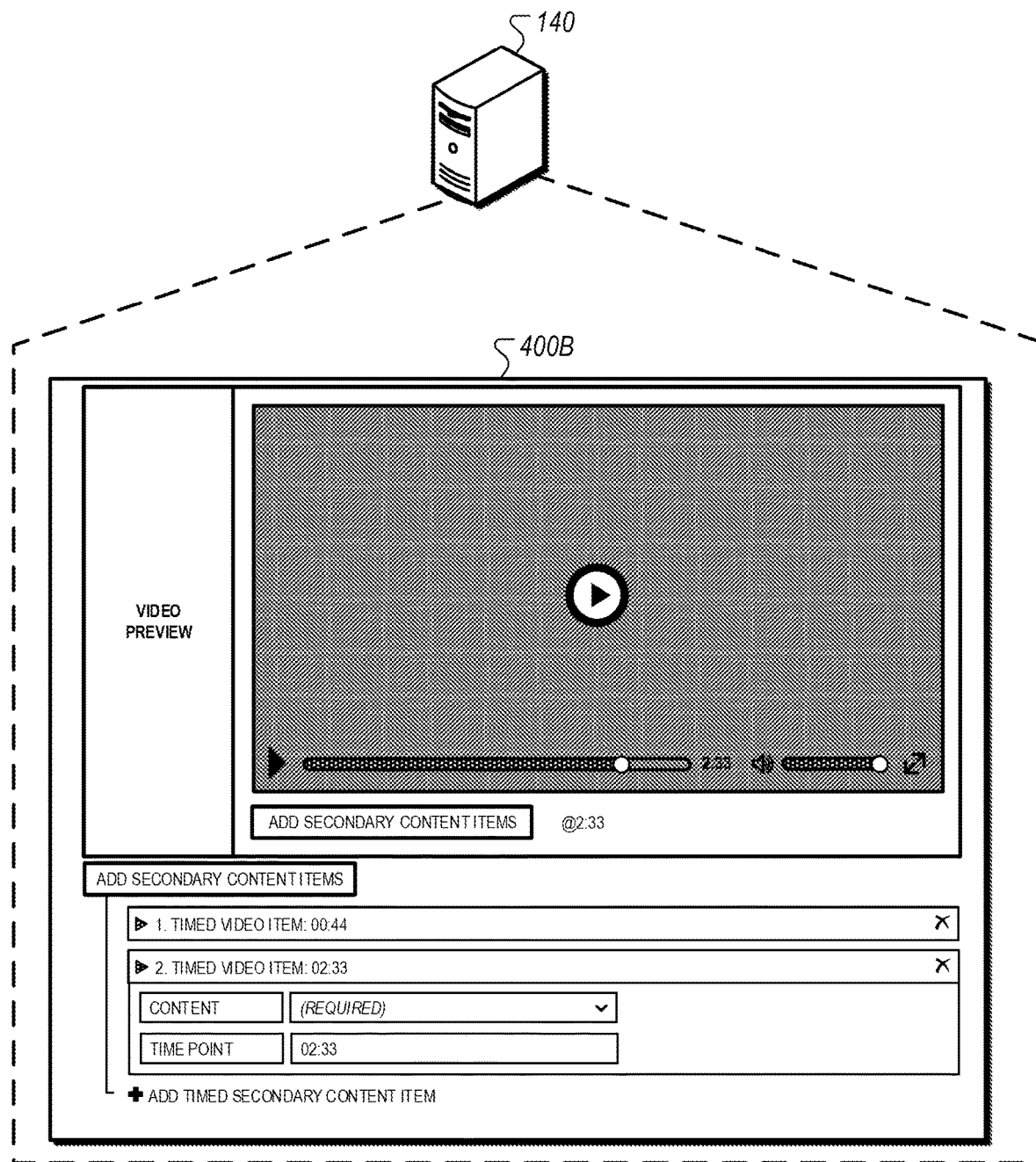
Figure 4D:
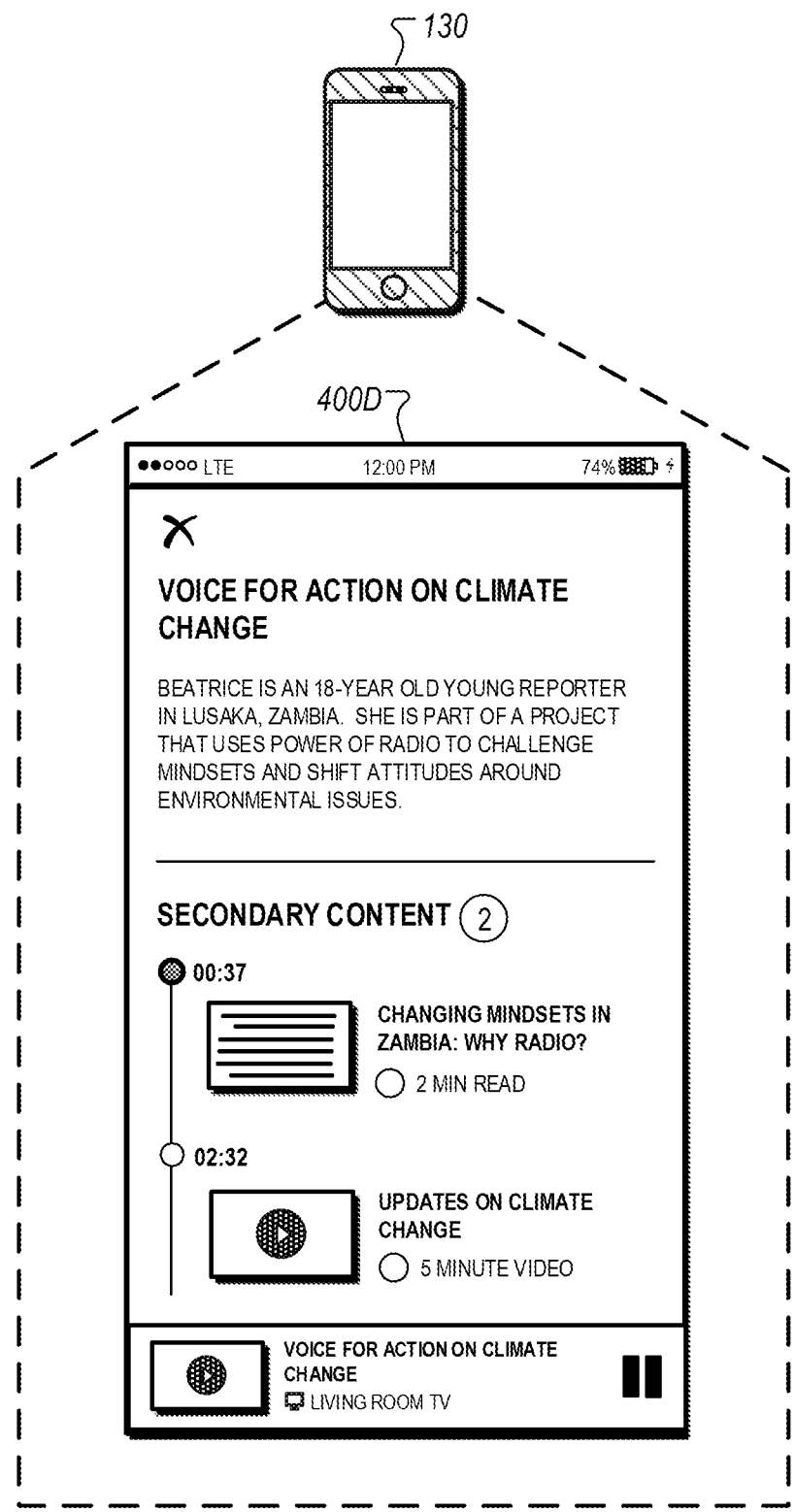

FIGS. 4A-D illustrate examples of user interfaces 400A-D that are provided to different users. FIGS. 4A-B illustrate examples of user interfaces that can be used by content providers and/or content distributes to manually generate content association data that is used by the system 100 to provide secondary content items to users while accessing primary content. FIGS. 4C and 4D illustrate examples of user interfaces that are provided to users on a computing device where primary content is accessed and a computing device where secondary content items are accessed, respectively.

Referring initially to FIG. 4A, a user interface 400A for manually associating secondary content items to primary content at specified time points is illustrated. Content providers and/or content distributors can use the interface 400A through the application server 140. In the example depicted, a user uses the interface 400A to upload five pieces of secondary content, which are generally associated with primary content. The user can specify an order in which secondary content items should be associated with the primary content. As shown, secondary content items can include video content, audio content, image content, or textual content such as articles.

Referring now to FIG. 4B, a user interface 400B for manually specifying time points to display secondary content items during playback of the primary content is illustrated. Content providers and/or content distributors can use the interface 400B through the applications server 140. In the example depicted, a user can add a secondary content item to a specified time point within the playback of the primary content. As shown, a secondary content item is associated with the primary content as time point "02:33." Once configured, the content association specified on the user interface 400B can be used by the system 100 to provide a communication that includes the secondary content item once playback of the primary content passes a designated frame associated with the time point "02:33" as discussed above.

Referring now to FIG. 4C, a user interface 400C for viewing primary content on a display device is illustrated. In this example, a user can select from among multiple a list of videos to access on the display device. Once playback of a selected video initiates, a user can be provided with access to secondary content on the display where the primary content is presently being accessed. In the example depicted in FIG. 4C, for instance, the user is provided with a communication 420 that identifies secondary content associated with a presently playing video titled "REPORT ON ACTION ON CLIMATE CHANGE." In this example, the communication 420 is provided on the same device as the device accessing the primary content, e.g., the computing device 110.

Alternatively, in other implementations, such as the example depicted in FIG. 4D, a user accesses secondary content items on a separate device from the device where the primary content is being accessed. For example, interface 400D is presented on the computing device 130, which is a device within a proximity of the user when he/she is accessing primary content on a display device. In this example, the computing device 130 can be a smartphone that is within reach of the user while, for example, the user watches the primary content on a television. The primary content in this example is the video being accessed on the interface 400C, which is a video titled "VOICE FOR ACTION ON CLIMATE CHANGE."

As shown, the interface 400D provides metadata for the primary content, e.g., video title and metadata, as well as information on secondary content items that are associated with the primary content. In this example, the primary content is associated with two pieces of secondary content at two specified time points within the playback of the primary content. For example, an article titled "CHANGING MINDSETS IN ZAMBIA: WHY RADIO" is assigned to a frame of the primary content corresponding to the time point "00:37" whereas a secondary video titled "UPDATES ON CLIMATE CHANGE" is assigned to a frame of the primary content corresponding to the time point "02:32." A user can access the secondary content items at assigned time point, or alternatively before the playback of the primary content reaches the assigned time point.

Figure 5:
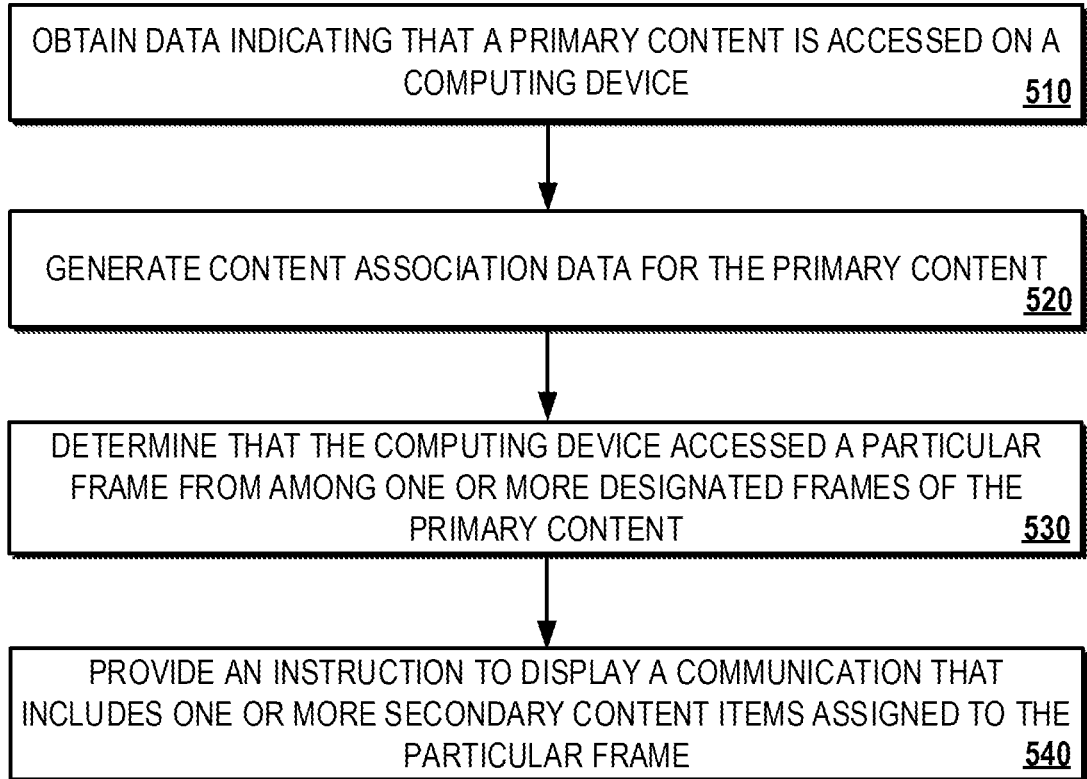
FIG. 5 illustrates an example of a process for dynamically synchronizing secondary content during specified time points of accessed primary content.

FIG. 5 illustrates an example of a process 500 for dynamically synchronizing secondary content during specified time points of accessed primary content. Briefly, the process 500 can include the operations of obtaining data indicating that a primary content is accessed on a computing device (510), generating content association data for the primary content (520), determining that the computing device accessed a particular frame of the primary content (530), and providing an instruction to display a communication that includes one or more secondary content items to the computing device (540).

In general, the process 500 is described in reference to the system 100, although any other system can perform the operations of the process 500. In one example, the operation 400 is performed in association with primary content and secondary content items that are provided on the same device, e.g., the computing device 110. In another example, the operation 400 is performed in association with primary content and secondary content items that are provided on different devices, e.g., the computing devices 110 and 130.

In detail, the process 500 can include the operation of obtaining data indicating that a primary content is accessed on a computing device (510). For example, the server system 120 obtains the playback data 104 indicating that the primary content 112 is accessed on the computing device 110.

The process 500 can include the operation of generating content association data for the primary content (520). For example, the server system 120 generates the content association data 122. As depicted in FIG. 1A, content association data 122 specifies one or more designated frames of the primary content 112 such as the designated frames 112A. The content association data 122 also specifies one or more secondary content items that are assigned to each of the one or more designated frames such as the secondary content item 124A assigned to the designated frame 112A.

As discussed above, the content association data 122 can be generated at different time points in relation to playback of the primary content 112. In some instances, the content association data 122 is generated manually by, for example, a content provider or a content distributor. In such instances, designated frames within the primary content 112 that are assigned to secondary content items are predetermined and known when the primary content 112 is accessed on the computing device 130. Alternatively, in other instances, the content association data 122 is dynamically determined when the primary content 112 is accessed by the user 101 or during playback of the primary content 112 on the computing device 130. In such instances, frames of the primary content 112 can be designated and assigned to secondary content in real-time based on, for example, user activity data received through devices of the user 101, or context data indicating a predicted context of the user 101 as he/she accesses the primary content. As discussed above in FIGS. 3A and 3B, in such instances where content association data 122 is dynamically generated, associations to secondary content can be varied with respect to the designated frames of the primary content 112 and the secondary content items assigned to each designated time point. As examples, the content association data 122 can specify different content associations for users having different user attributes that access the primary content 112 as depicted in FIG. 3A, or alternatively, for the same user that is predicted to be in different contexts when accessing the primary content 112 as depicted in FIG. 3B.

The process 500 can include the operation of determining that the computing device accessed a particular frame of the primary content (530). For example, the server system 120 determines that the computing device 130 accessed a particular frame from among the one or more designated frames such as the designated frame 112A. As depicted in FIG. 1B, the server system 120 can monitor the playback of the primary content 112 on the computing device 130 until the playback has reached a time point corresponding to a designated frame specified within the content association data 122. The server system 120 can monitor playback periodically, e.g., every five seconds, or in real-time.

The process 500 can include the operation of providing an instruction to display a communication that includes one or more secondary content items to the computing device (540). For example, in response to determining that the computing device 110 has accessed the designated frame 112A, the server system 120 provides the instruction 106 to display the communication 108. As depicted in FIG. 1A, the communication 108 includes the secondary content item 124A assigned to the designated frame 112A within the content association data 122.

Figure 6:
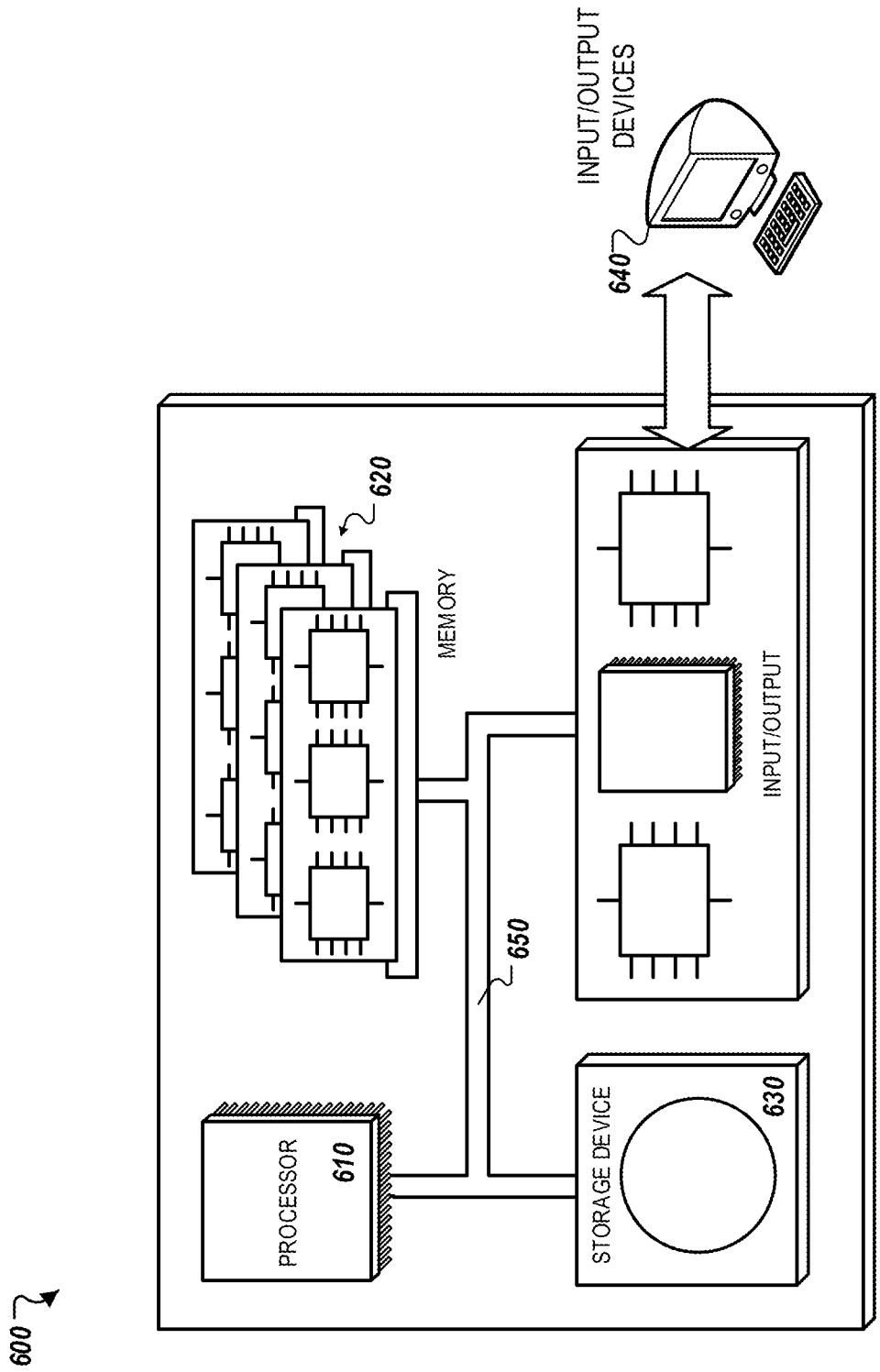
FIG. 6 is a block diagram of computing devices on which the processes described herein, or portions thereof, may be implemented.

FIG. 6 illustrates a schematic diagram of a computer system 600 that can be applied to any of the computer-implemented methods and other techniques described herein. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 600 includes a processor 610, a memory 620, a storage device 630, and an input/output device 640. Each of the components 1010, 1020, 1030, and 640 are interconnected using a system bus 650. The processor 610 is capable of processing instructions for execution within the system 600. The processor can be designed using any of a number of architectures. For example, the processor 610 can be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A method, comprising:
obtaining, by a server system, data comprising a set of user attributes, the data indicating that a primary content is accessed on a first computing device;
generating, by the server system, content association data for the primary content, the content association data specifying (i) one or more designated frames of the primary content, and (ii) one or more secondary content items assigned to each of the one or more designated frames, the one or more secondary content items associated with the set of user attributes indicated in the data;
determining, by the server system, that the first computing device accessed a particular frame of the primary content from among the one or more designated frames; and
in response to determining that the first computing device is accessing the particular frame of the primary content, providing, by the server system and for output to the first computing device, an instruction to display a communication that includes the one or more secondary content items assigned to the particular frame within the content association data.

2. The method of claim 1, comprising:
determining that a second computing device is likely to be available to a user for accessing an indication associated with the one or more secondary content items; and
determining that the second computing device is most likely among the set of computing devices to be used by the user during a time period in which the primary content is accessed on the first computing device.

3. The method of claim 1, further comprising:
determining, by the server system, a predicted context associated with a user when the one or more designated frames is accessed by the user on the first computing device; and
wherein identifying the content association data for the primary content comprises:
selecting, from the one or more secondary content items, a secondary content item that is determined to be associated with the predicted context associated with the user; and
assigning the secondary content item to the one or more designated frames of the primary content.

4. The method of claim 1, further comprising:
obtaining, by the server system, data indicating a set of user attributes for a user; and
wherein identifying the content association data for the primary content comprises:
selecting a particular content item that is determined to be associated with the set of user attributes; and
assigning the particular content item to the one or more designated frames of the primary content.

5. The method of claim 2, wherein:
the indication comprises a communication that includes a reference to the one or more secondary content items; and
upon selection of the reference by the user, the instruction causes a second computing device to display the one or more secondary content items.

6. The method of claim 1, comprising:
determining that a second computing device is likely to be available to a user for accessing an indication associated with the one or more secondary content items; and
determining that the second computing device is within a threshold proximity to the first computing device.

7. The method of claim 6, wherein:
the first computing device comprises a stationary display device; and
the second computing device comprises a mobile device.

8. A system comprising:
one or more computing devices; and
one or more non-transitory computer storage media encoded with a computer program, the computer program comprising instructions that when executed by the one or more computing devices causes performance of operations comprising:
obtaining, by a server system, data comprising a set of user attributes, the data indicating that a primary content is accessed on a first computing device;
generating, by the server system, content association data for the primary content, the content association data specifying (i) one or more designated frames of the primary content, and (ii) one or more secondary content items assigned to each of the one or more designated frames, the one or more secondary content items associated with the set of user attributes indicated in the data;
determining, by the server system, that the first computing device accessed a particular frame of the primary content from among the one or more designated frames; and
in response to determining that the first computing device is accessing the particular frame of the primary content, providing, by the server system and for output to the first computing device, an instruction to display a communication that includes the one or more secondary content items assigned to the particular frame within the content association data.

9. The system of claim 8, wherein the operations further comprise:
determining, by the server system, that a second computing device, from among the set of computing devices known to be associated with a user, is likely to be available to the user for accessing an indication associated with the one or more secondary content items; and determining that the second computing device is most likely among the set of computing devices to be used by the user during a time period in which the primary content is accessed on the first computing device.

10. The system of claim 8, wherein the operations further comprise:

determining, by the server system, a predicted context associated with a user when the one or more designated frames is accessed by the user on the first computing device; and wherein identifying the content association data for the primary content comprises:

selecting, from the one or more secondary content items, a secondary content item that is determined to be associated with the predicted context associated with the user; and assigning the secondary content item to the one or more designated frames of the primary content.

11. The system of claim 8, wherein the operations further comprise:

obtaining, by the server system, data indicating a set of user attributes for a user; and wherein identifying the content association data for the primary content comprises:

selecting a particular content item that is determined to be associated with the set of user attributes; and assigning the particular content item to the one or more designated frames of the primary content.

12. The system of claim 9, wherein:

the indication comprises a communication that includes a reference to the one or more secondary content items; and upon selection of the reference by the user, the indication causes the second computing device to display the one or more secondary content items.

13. The system of claim 8, comprising:

determining, by the server system, that a second computing device, from among the set of computing devices known to be associated with a user, is likely to be available to the user for accessing an indication associated with the one or more secondary content items; and determining that the second computing device is within a threshold proximity to the first computing device.

14. At least one non-transitory computer-readable storage media storing instructions that, when executed by one or more processors, causes the one or more processors to perform operations comprising:

obtaining, by a server system, data comprising a set of user attributes, the data indicating that a primary content is accessed on a first computing device;

generating, by the server system, content association data for the primary content, the content association data specifying (i) one or more designated frames of the primary content, and (ii) one or more secondary content items assigned to each of the one or more designated frames, the one or more secondary content items associated with the set of user attributes indicated in the data;

determining, by the server system, that the first computing device accessed a particular frame of the primary content from among the one or more designated frames; and in response to determining that the first computing device is accessing the particular frame of the primary content, providing, by the server system and for output to the first computing device, an instruction to display a communication that includes the one or more secondary content items assigned to the particular frame within the content association data.

15. The non-transitory computer-readable storage media of claim 14, comprising:

determining, by the server system, that a second computing device, from among the set of computing devices known to be associated with a user, is likely to be available to the user for accessing an indication associated with the one or more secondary content items; and determining that the second computing device is most likely among the set of computing devices to be used by the user during a time period in which the primary content is accessed on the first computing device.

16. The non-transitory computer-readable storage media of claim 14, wherein the operations further comprise:

determining, by the server system, a predicted context associated with a user when the one or more designated frames is accessed by the user on the first computing device; and wherein identifying the content association data for the primary content comprises:

selecting, from the one or more secondary content items, a secondary content item that is determined to be associated with the predicted context associated with the user; and assigning the secondary content item to the one or more designated frames of the primary content.

17. The non-transitory computer-readable storage media of claim 14, wherein the operations further comprise:

obtaining, by the server system, data indicating a set of user attributes for a user; and wherein identifying the content association data for the primary content comprises:

selecting a particular content item that is determined to be associated with the set of user attributes; and assigning the particular content item to the one or more designated frames of the primary content.

18. The non-transitory computer-readable storage media of claim 15, wherein:

the indication comprises a communication that includes a reference to the one or more secondary content items; and upon selection of the reference by the user, the instruction causes a second computing device to display the one or more secondary content items.

19. The non-transitory computer-readable storage media of claim 14, comprising:

determining, by the server system, that a second computing device, from among the set of computing devices known to be associated with a user, is likely to be available to the user for accessing an indication associated with the one or more secondary content items; and determining that the second computing device is within a threshold proximity to the first computing device.

20. The non-transitory computer-readable storage media of claim 19, wherein:
the first computing device comprises a stationary display device; and
the second computing device comprises a mobile device.

* * * * *